United States Patent [19]

Wermelin

[11] 4,272,388
[45] Jun. 9, 1981

[54] LIGHTWEIGHT INJECTABLE, THIXOTROPIC FOAM INSULATING MATERIAL

[76] Inventor: Harald Wermelin, Gullmarsvägen 12, Johanneshov, Sweden, S-121 41

[21] Appl. No.: 132,654

[22] Filed: Mar. 21, 1980

Related U.S. Application Data

[63] Continuation of Ser. No. 20,643, Mar. 15, 1979, abandoned, which is a continuation of Ser. No. 902,391, May 3, 1978, abandoned.

[30] Foreign Application Priority Data

Nov. 12, 1976 [SE] Sweden ................. 7612649

[51] Int. Cl.$^3$ ............... C04B 43/02; C04B 43/00
[52] U.S. Cl. ................... 252/62; 106/85; 106/86; 106/122
[58] Field of Search ............ 252/62; 106/85, 86, 106/87, 122; 264/45.3

[56] References Cited

U.S. PATENT DOCUMENTS

| | | | |
|---|---|---|---|
| 2,214,358 | 9/1940 | Williams | 252/62 X |
| 2,884,380 | 4/1959 | Cook et al. | 252/62 |
| 3,015,626 | 1/1962 | Kingsbury | 252/62 |
| 3,041,190 | 6/1962 | Griffith et al. | 252/62 X |
| 3,244,632 | 4/1966 | Scholz et al. | 252/62 |
| 3,300,372 | 1/1967 | Bauer | 162/145 |
| 3,514,403 | 5/1970 | Muendel | 252/62 |
| 3,623,938 | 11/1971 | Jenkins | 252/62 X |
| 3,725,095 | 4/1973 | Weidman et al. | 252/62 X |
| 3,963,507 | 6/1976 | Kuramoto et al. | 106/86 |
| 3,989,534 | 11/1976 | Plunguian et al. | 106/87 X |

FOREIGN PATENT DOCUMENTS 2058431  5/1971  France ................. 252/62

*Primary Examiner*—Harris A. Pitlick
*Attorney, Agent, or Firm*—Schuyler, Banner, Birch, McKie & Beckett

[57] ABSTRACT

An injectable thixotropic material for use as insulating material, characterized in that it comprises a mixture of 250–1500 parts by weight of water, 5–70 parts by weight of binder, 1–10 parts by weight anionic or cationic wetting agent, 10–100 parts by weight of mineral wool, 30–300 parts by weight of expanded vermiculite, optionally 1–10 parts by weight of ammonia, and optionally a difficulty fusible ballast material.

10 Claims, No Drawings

LIGHTWEIGHT INJECTABLE, THIXOTROPIC FOAM INSULATING MATERIAL

This is a continuation of application Ser. No. 20,643, filed Mar. 15, 1979, now abandoned which is a continuation of application Ser. No. 902,391 filed May 3, 1978 now abandoned.

This invention relates to a new compound to be used as insulating material, e.g. at heat and fire insulation in house construction.

Requirements of insulating materials, are i.a. that they should insulate against cold as well as heat and, preferably, also against fire, and should be sound-proof etc. Most known insulating materials of e.g. plastic insulate relatively well against cold but are very unfavourably influenced by heat, e.g. several foam plastics are very unfavourably influenced already at very moderate temperatures.

In recent years various types of foam plastics, such as polyurethane plastics, have to an ever increasing extent been used as insulating material in house construction and the like. Asbestos has mostly been used as reinforcing and ballast material when producing heat and flameproof insulating materials. Such types of insulating material have great disadvantages, as they are very hazardous to the environment in certain situations. Work with asbestos fibers is almost completely prohibited in Sweden due to the carcinogenic properties thereof (socalled asbestosis). Moreover, a number of fire accidents have in recent years come to a tragic end, as it has appeared that some insulating materials of plastic, at the temperatures concerned in fires, develop very poisonous gases, e.g. HCN from polyurethane plastics, hydrochloric acid, of which the latter is developed also at small fires and causes great damage i.a. to metallurgical equipments, and i.a. the insurance companies have started to give instructions what is to be considered and which measures should be taken in connection herewith. Furthermore, there are problems with known, injectable heat insulating materials, which are e.g. used in insulation of floor and wall portions, viz. that these materials shrink to a relatively large extent and have a bad adhesion. Insulation with such materials must always be carried out at several different times to achieve a fairly good filling up of the space to be insulated, which will be time-consuming and expensive. However, in spite of the fact that the material per se exhibits a good λ-value, in practice no particularly good insulation is obtained due to the shrinkage.

In recent years an intensive research and development activity has been carried out to achieve insulation materials that, when being produced, are safe in handling, and which materials have good insulating properties in view of fire as well as heat insulation and in respect of shrinkage. No real, economically feasible solution of these problems has so far been found.

The present invention relates to a new material to be used as insulating material, which does not suffer from the above disadvantages. The new material of the present invention is a material insulating against and thus operating in cold as well as heat, it does not cause damage at fires (i.a. no poisonous gases being developed), it does not shrink and has good adhesion, which gives a practical λ-value that substantially agrees with the theoretical one, it is environmental non-hazardous, i.e. it does not contain any poisonous substances, and it is easy to inject and in practice useful at working sites, without necessitating the use of complicated equipment.

The new material of the invention comprises a mixture of water, binder, wetting agent, water glass, mineral wool, expanded vermiculite and optionally ammonia.

Binders useable in the material of the present invention are e.g. carboxymethyl cellulose, starch, binders of acrylate type and cement, the latter being suitable to be used in high-temperature resistant insulating materials, the former being suitable in injectible heat insulating materials.

Usable wetting agents in material of the present invention are such of anion and cation type, preferably of anion type. Examples of suitable anionic wetting agents are such of carboxylate type, sulfonate type, sulphate type etc. Examples of suitable cationic wetting agents are such containing quaternary nitrogen.

When ammonia is incorporated in the material of the present invention the material will stabilize faster, which is especially appropriate in connection with readily injectable compounds. As to materials of high temperature resistance the incorporation of a difficultly fusible ballast material, such as finely ground, crushed refractory brick, is suitable, as this increases the temperature resistance of the material.

The composition of the components included in the new material of the present invention is as follows: 250–1500 parts by weight of water, 5–70 parts by weight of binder, 1–10 parts by weight of wetting agents, 10–100 parts by weight of mineral wool, 30–300 parts by weight of expanded vermiculite and optionally 1–10 parts by weight of ammonia. Moreover, the material may contain 100–200 parts by weight of difficultly fusible ballast material. The new material contains preferably the following composition of the components: 500–1000 parts by weight of water, 15–70 parts by weight of binder, 3–6 parts by weight of wetting agent, 30–50 parts by weight of mineral wool, 60–250 parts by weight of expanded vermiculite and optionally 3–6 parts by weight of ammonia.

The invention is illustrated more in detail in the following examples.

EXAMPLE 1

A readily injectable material according to the present invention is prepared by whipping together 1000 g water, 15 g Modocoll ® Ek 7000 PQ and 5 ml ammonia after which 50 g water glass and 5 ml Teepol ® are added. This is whipped to a foam. 50 g Rockwool ® mineral wool is added and all of it is mixed to a homogeneous material. 250 g expanded vermiculite are then admixed.

This material is thixotropic and can be applied under a low pressure through a hose, even a rather narrow one having a diameter of e.g. 10 mm, without the thixotropic properties of the material being lost. This readily injectable material is suitable for insulation of e.g. floor and wall portions and it has a λ-value of 0.0675 kcal/m h°C. and a bulk density of 0.145 g/cm$^3$.

The same material is prepared, but with exclusion of ammonia. The material will then be stabilized a little more slowly than that mentioned before, but it has the same properties as this.

Starch can also be used as binder, more specifically in the same amount as Modocoll ®, a readily injectable material with the same properties as the previous ones being obtained.

EXAMPLE 2

It is proceeded as in Example 1, but instead of Rockwool ® Mineral wool 50 g Rockwool ® Mineral fiber No. 4 (without knots) are used. A readily injectable and thixotropic material is also obtained, which has the same ranges of application as those in Example 1. The material has a λ-value of 0.051 kcal/m h°C. and a bulk density of 0.085 g/cm³ as well as a shrinkage in dried state of 4°/00.

EXAMPLE 3

It is proceeded as in Example 1, but instead of 15 g Modocoll ® 50 g binder of acrylate type are used. Also this material is thixotropic and readily injectable and has the same ranges of application as those in Example 1.

EXAMPLE 4

For the preparation of an insulating material standing high temperatures 500 g water, 50 g refractory cement (Secar ® 250), 150 g commercially available crushed brick (refractory, finely ground), 50 g water glass, 30 g Rockwool ® Mineral wool and 60 g expanded vermiculite are mixed. A material is obtained standing temperatures in excess of 1000° C. This material is very suitable as heat-resistant insulating material.

Instead of Rockwool ® Mineral wool the same amount of Rockwool ® Mineral fiber No. 4 can be used, a material having the same properties and ranges of application as the previous one being obtained.

Among the advantages of the material according to the present invention to be mentioned are that it is relatively cheap to produce, it is non-hazardous and difficult to set on fire and does not develop any smoke in heating with an open flame thereon. Moreover, it can be stored on a cold place and its shrinkage can be neglected, which means that the good λ-value that applies to the material per se is obtained in practice in heat insulation of spaces with the material. Furthermore, the material is thixotropic and readily applicable in some embodiments.

As a comparison some insulation materials used today can be mentioned, such as Styropor ® having a good λ-value (0.040) but which is expensive and easily set on fire and develops a poisonous smoke at fire, or Isoschaum ®, which has a shrinkage of 3-4% (about 15-20% in dried state), and therefore its practical λ-value is negligible.

What I claim is:

1. An injectable, thixotropic material for use as insulating material, characterized in that it comprises a mixture of 250-1500 parts by weight of water, 5-70 parts by weight of binder, 1-10 parts by weight anionic or cationic wetting agent, 10-100 parts by weight of mineral wool, 30-300 parts by weight of expanded vermiculite, and optionally 1-10 parts by weight of ammonia; said material having a bulk density from about 0.085 g/cm³ to about 0.145 g/cm³.

2. The material of claim 1, characterized in that the binder is carboxymethyl cellulose.

3. The material of claim 1, characterized in that the binder is starch.

4. The material of claim 1, characterized in that the binder is of acrylate type.

5. The material of any of claims 1-4, characterized in that the wetting agent is an anionic wetting agent of alkyl sulphate type.

6. The material of claim 1, characterized in that said mixture comprises 1-10 parts by weight of ammonia.

7. An injectable, thixotropic material for use as insulating material characterized in that it consists essentially of a mixture of 250-1500 parts by weight of water, 5-70 parts by weight of a binder selected from the group consisting of carboxymethyl cellulose, starch and acrylate binders, 1-10 parts by weight of anionic or cationic wetting agent, 10-100 parts by weight of mineral wool, 30-300 parts by weight of expanded vermiculite, and optionally 1-10 parts by weight of ammonia.

8. The material of claim 7, characterized in that said mixture comprises 1-10 parts by weight of ammonia.

9. The material of claim 7, characterized in that the wetting agent is an anionic wetting agent of the alkyl sulfate type.

10. The material of claim 7 characterized in that said binder additionally contains water glass.

UNITED STATES PATENT AND TRADEMARK OFFICE
CERTIFICATE OF CORRECTION

PATENT NO. : 4,272,388
DATED : June 9, 1981
INVENTOR(S) : Harald Wermelin

It is certified that error appears in the above—identified patent and that said Letters Patent is hereby corrected as shown below:

Title Page, delete "[30] Foreign Application Priority Data

Nov. 12, 1976 [SE] Sweden ..................................... 7612649"

Signed and Sealed this

Eighteenth Day of May 1982

[SEAL]

Attest:

GERALD J. MOSSINGHOFF

Attesting Officer

Commissioner of Patents and Trademarks